(12) United States Patent
Benson et al.

(10) Patent No.: US 11,161,397 B2
(45) Date of Patent: Nov. 2, 2021

(54) SYSTEMS AND METHODS FOR REDUCING STRAIN ON A VEHICLE DOOR USING A RELIEF BRACKET

(71) Applicant: TOYOTA MOTOR ENGINEERING & MANUFACTURING NORTH AMERICA, INC., Plano, TX (US)

(72) Inventors: Blaine C. Benson, Ann Arbor, MI (US); Keith O'Brien, Highland, MI (US); Alyssa J. Flowers-Bouman, South Lyon, MI (US); Erik Andersen, Ann Arbor, MI (US); Wasim Ukra, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 142 days.

(21) Appl. No.: 16/525,862

(22) Filed: Jul. 30, 2019

(65) Prior Publication Data
US 2021/0031600 A1 Feb. 4, 2021

(51) Int. Cl.
*B60J 5/04* (2006.01)

(52) U.S. Cl.
CPC ........... *B60J 5/0408* (2013.01); *B60J 5/0402* (2013.01); *B60J 5/0413* (2013.01); *B60J 5/0463* (2013.01); *B60J 5/0468* (2013.01)

(58) Field of Classification Search
CPC ...... B60J 5/0402; B60J 5/0408; B60J 5/0468; B60J 1/17; B60J 5/0413
USPC ..................................................... 296/146.2
See application file for complete search history.

(56) References Cited

U.S. PATENT DOCUMENTS

| 4,605,260 A  * | 8/1986  | Sakakibara ............... B60J 1/14 |
|              |         |                        296/146.2 |
| 9,132,720 B2 | 9/2015  | Yokota |
| 9,790,728 B2 * | 10/2017 | Arimoto .................... B60J 1/17 |
| 2007/0262607 A1 | 11/2007 | Saito |
| 2008/0238134 A1 * | 10/2008 | Guellec ...................... B60J 1/10 |
|              |         |                        296/146.2 |
| 2015/0165881 A1 * | 6/2015  | Bang ........................ B60J 10/75 |
|              |         |                        296/146.2 |
| 2015/0246597 A1 | 9/2015  | Koike |
| 2018/0154742 A1 | 6/2018  | Iwai et al. |
| 2020/0276890 A1 * | 9/2020  | Kimura ...................... B60J 5/04 |

FOREIGN PATENT DOCUMENTS

| JP | 60219117 A  * | 11/1985 | ........... B60J 5/0402 |
| JP | 2006-137346 A  * | 6/2006 | |

OTHER PUBLICATIONS

Machine Translation of JP60219117A, printed from the EPO website, Feb. 13, 2021.*

* cited by examiner

*Primary Examiner* — Jason S Morrow
(74) *Attorney, Agent, or Firm* — Haynes and Boone, LLP (57) ABSTRACT

A system for reducing strain on a vehicle door comprises the vehicle door. The vehicle door comprises an inner panel and a division bar comprising a first portion and a second portion. The system further comprises a relief bracket configured to reduce strain on the inner panel when the vehicle door is closed. The relief bracket comprises a first portion coupled to the second portion of the division bar, a second portion coupled to the inner panel, and a relief portion extending between the first portion and the second portion.

20 Claims, 7 Drawing Sheets

SYSTEMS AND METHODS FOR REDUCING STRAIN ON A VEHICLE DOOR USING A RELIEF BRACKET

TECHNICAL FIELD

The present disclosure relates generally to reducing strain on a vehicle door and, more particularly, using a relief bracket to reduce strain on an inner panel of a vehicle door imparted by a vehicle window when the door is opened or closed.

BACKGROUND

When opening and closing a door of a vehicle, the windows impart a high strain on an inner panel of a door of a vehicle. The high strain may be imparted through a division bar, which provides a guide for the windows and is coupled to the inner panel of the door by one or more brackets. Existing brackets lack the ability to reduce the strain put on the inner panel by the windows. High strain can result in low durability for the inner panel of the door, which can lead to broken components on the inner panel, ultimately resulting in the need for a replacement inner panel and/or a replacement door altogether. A bracket is needed to reduce the strain put on the inner panel of the door.

SUMMARY

The present disclosure provides systems and methods for reducing strain on a vehicle door using a relief bracket. A generalized system for reducing strain on a vehicle door includes the vehicle door. The vehicle door includes an inner panel and a division bar comprising a first portion and a second portion. The system further includes a relief bracket configured to reduce strain on the inner panel when the vehicle door is closed. The relief bracket includes a first portion coupled to the second portion of the division bar. The relief bracket further includes a second portion coupled to the inner panel. The relief bracket further includes a relief portion extending between the first portion and the second portion.

A generalized system for reducing strain on a vehicle door includes the vehicle door. The vehicle door includes an inner panel and a division bar comprising a first portion and a second portion. The system further includes a relief bracket configured to reduce strain on the inner panel when the vehicle door is closed. The relief bracket includes a first portion coupled to the second portion of the division bar. The relief bracket further includes a second portion coupled to the inner panel. The relief bracket further includes a relief portion extending between the first portion and the second portion. When the strain is imparted on the inner panel of the vehicle door, the relief portion of the relief bracket is configured to compress in a direction generally perpendicular to the inner panel.

A generalized method for reducing strain on a vehicle door includes receiving, by a relief bracket, a force when the vehicle door is opened or closed. The force imparts the strain on the relief bracket. The method further includes transferring the strain on the relief bracket to a relief portion of the relief bracket, and the relief bracket is coupled to an inner panel of the vehicle door. The method further includes reducing, by the relief portion, the strain to reduce a strain on the inner panel. A first portion of the relief bracket is coupled to a division bar, a second portion of the relief bracket is coupled to the inner panel, and the relief portion of the relief bracket extends between the first and second portions of the relief bracket.

DETAILED DESCRIPTION

For the purposes of promoting an understanding of the principles of the invention, reference will now be made to certain implementations, or examples, illustrated in the drawings, and specific language will be used to describe the same. It will nevertheless be understood that no limitation of the scope of the invention is thereby intended. Any alterations and further modifications in the described implementations, and any further applications of the principles of the invention as described herein are contemplated as would normally occur to one skilled in the art to which the invention relates.

This disclosure describes illustrative systems and methods for reducing strain on a vehicle door. In the system, a relief bracket is used to reduce the strain on the vehicle door. The strain is conveyed to an inner panel of the vehicle by a window of the vehicle door when the door is opened and/or closed. The vehicle door includes an outer panel, an inner panel, and a recess between the outer and inner panels. The door also includes a first window, which may be a fixed window, and a second window, which may be a sliding window. The sliding window may slide between a position outside of a recess between the outer and inner panels (e.g., when the window is rolled up) and a position inside the recess (e.g., when the window is rolled down). The door may also include a division bar, which includes a portion outside the recess and a portion inside the recess. The division bar helps guide the sliding window as the sliding window transitions from being rolled up to being rolled down and vise-versa. The relief bracket includes a relief portion that is configured to deflect when the door is opened and/or closed. The relief bracket also includes a first portion coupled to the division bar and a second portion coupled to the inner panel of the door. Thus, in some examples, the relief bracket is located within the recess of the door between the outer and inner panels. It is an advantage of the system that the deflection of the relief portion absorbs some of the strain, thereby reducing the amount of strain that is passed from the window to the inner panel of the door.

Figure 1:
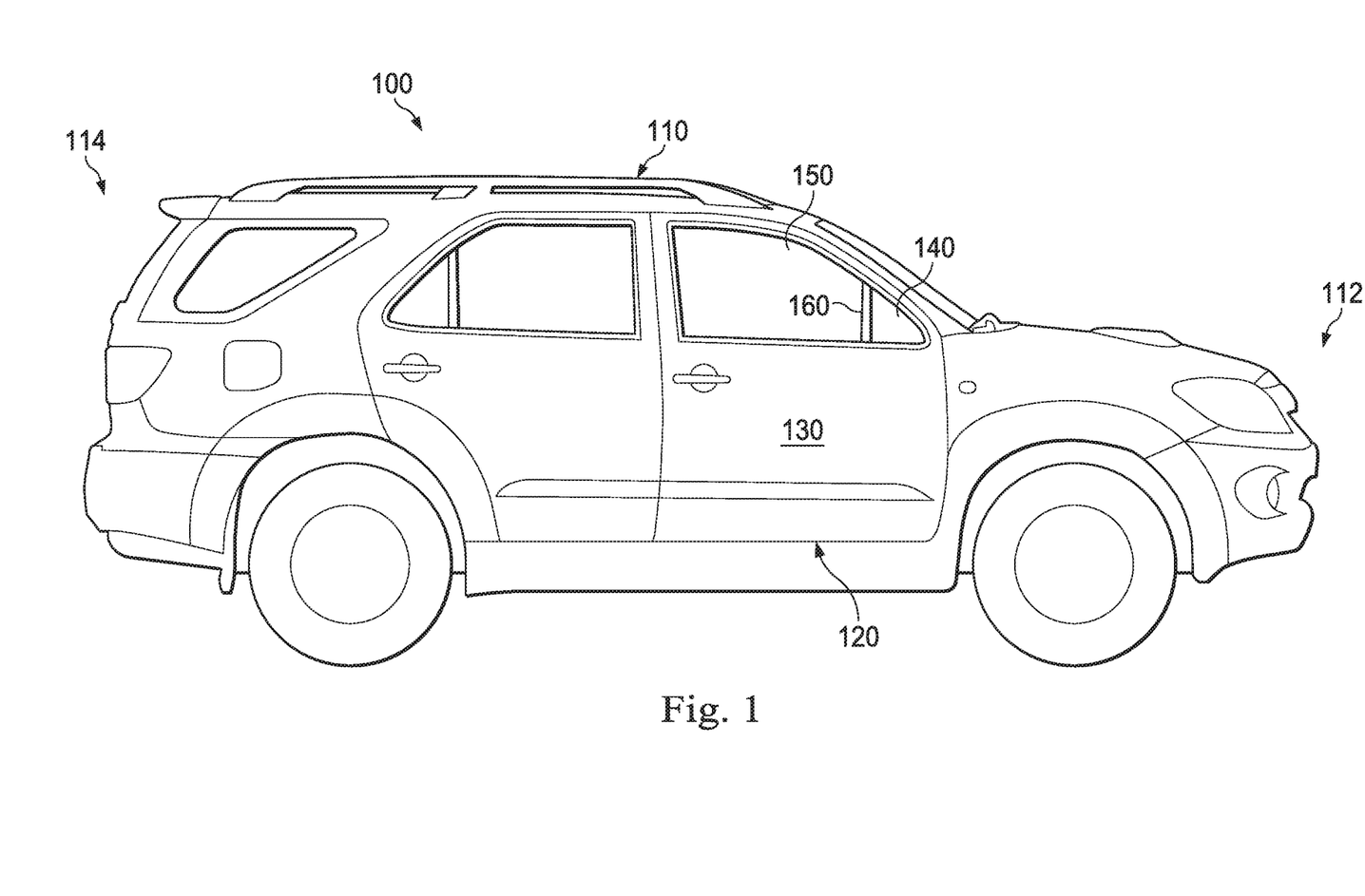
FIG. 1 is a diagrammatic illustration of a system for reducing strain on a vehicle door according to one or more embodiments of the present disclosure.

FIG. 1 is a diagrammatic illustration of an illustrative system for reducing strain on a vehicle door according to one or more embodiments of the present disclosure. In at least one such embodiment, as illustrated in FIG. 1, the system is generally referred to by the reference numeral 100 and includes a vehicle 110. In the embodiment of FIG. 1, the vehicle 110 includes a front portion 112, a rear portion 114 (which may also be referred to as a back portion), and at least one door 120. The door 120 includes an outer panel 130, a fixed window 140 (which may also be referred to as a first window and/or a fixed glass), a sliding window 150 (which may also be referred to as a second window and/or a sliding glass), and a division bar 160. In some examples, a recess is formed in the door 120 between the outer and inner panels 130, 200. In the embodiment of FIG. 1, the vehicle 110 is an automobile. It is to be understood that the vehicle 110 may be an SUV or any other type of suitable automobile (e.g., a sedan, a crossover, a pickup truck, a semi truck, a fleet vehicle, etc.). In several embodiments, the division bar 160 separates the fixed window 140 from the sliding window 150. Thus, when the sliding window 150 slides down into the recess of the door 120, the fixed window 140 remains in place above the recess.

The following discussion will be made with reference to embodiments when the door 120 is being closed. It is to be understood the discussion analogously applies to embodiments when the door 120 is being opened as well. In several examples, when the door 120 is being closed (e.g., by a driver of the vehicle 110, by a passenger of the vehicle 110, by a person outside of the vehicle 110, etc.), a force is conveyed on the inner panel 200 of the door 120. The force may be imparted by one or more of the fixed window 140, the sliding window 150, and any other component of the door 120. In several embodiments, the mass of the fixed window 140 and the sliding window 150 is large. For example, the mass of the sliding window 150 may range from 2500 grams to 5000 grams. The mass provided herein is for example only, and other embodiments may include larger or smaller masses. Therefore, in some examples, when the door 120 is closed, the force imparted by the fixed window 140 and/or the sliding window 150 is large. For example, the force imparted by the sliding window 150 may range from 150N to 200N. The force provided herein is for example only, and other embodiments may include larger or smaller forces. The force results in a strain being experienced by the inner panel 200 of the door 120. In some cases, the force and/or the strain experienced by the inner panel 200 of the door 120 causes one or more components of the inner panel 200 to break, fall off, or otherwise become damaged. Therefore, it would be advantageous to reduce the strain experienced by the inner panel 200 of the door 120.

In embodiments when the vehicle 110 is an SUV or another tall vehicle, the strain experienced by the inner panel 200 of the door 120 may be larger than the strain experienced by the inner panel 200 of a shorter vehicle, such as a sedan, for example. In embodiments when the vehicle 110 is tall, the strain may be larger than when the vehicle 110 is short because the fixed window 140 and the sliding window 150 are larger in taller vehicles. As discussed above, larger windows are heavier than smaller windows, and heavier windows impart a larger force on the door 120 than smaller windows. However, the force and/or the strain may vary depending on several other factors such as the shape of the door 120, the shape of the fixed window 140, the shape of the sliding window 150, the speed with which the door 120 is closed (e.g., if the door 120 is slammed shut or gently closed), etc.

Figure 2:
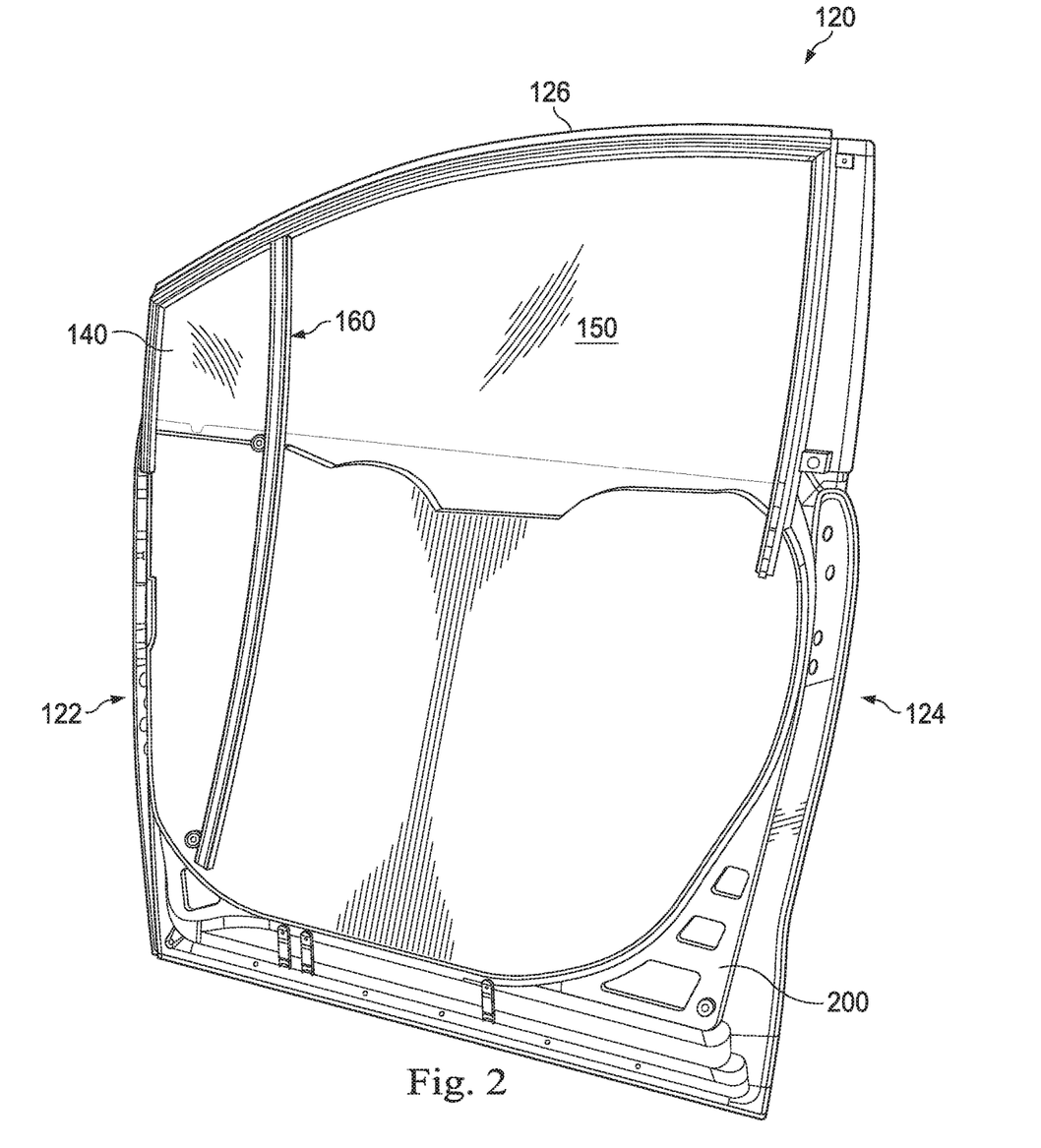
FIG. 2 is a global perspective view of a vehicle door according to one or more embodiments of the present disclosure.

FIG. 2 is a global perspective view of the vehicle door 120 according to one or more embodiments of the present disclosure. In the embodiment shown in FIG. 2, the door 120 includes a front portion 122 and a rear portion 124. The front portion 122 of the door 120 is closest to the front portion 112 of the vehicle 110 (see FIG. 1), and the rear portion 124 of the door 120 is closest to the rear portion 114 of the vehicle 110 (see FIG. 1). As shown in the embodiment of FIG. 2, the door 120 further includes a door frame 126. In several examples, the door frame 126 outlines the upper portion of the door 120. In such examples, the contour of the fixed window 140 and the sliding window 150 may match the contour of the door frame 126. In other examples, the door frame 126 may extend around any portion of the door 120, including, but not limited to, the entire perimeter of the door 120. As further shown in the embodiment of FIG. 2, the division bar 160 extends from the door frame 126 into a recess between the outer panel 130 and the inner panel 200 of the door 120. The division bar 160 may be coupled to the door 120 at one or more locations including, for example, at the door frame 126 and at the inner panel 200, which will be discussed in further detail below. In some embodiments, the division bar 160 is shaped to match the contour of the door 120. Thus, in some examples, the division bar 160 may be curved, straight, or a combination with some curved portions and some straight portions.

Figure 3:
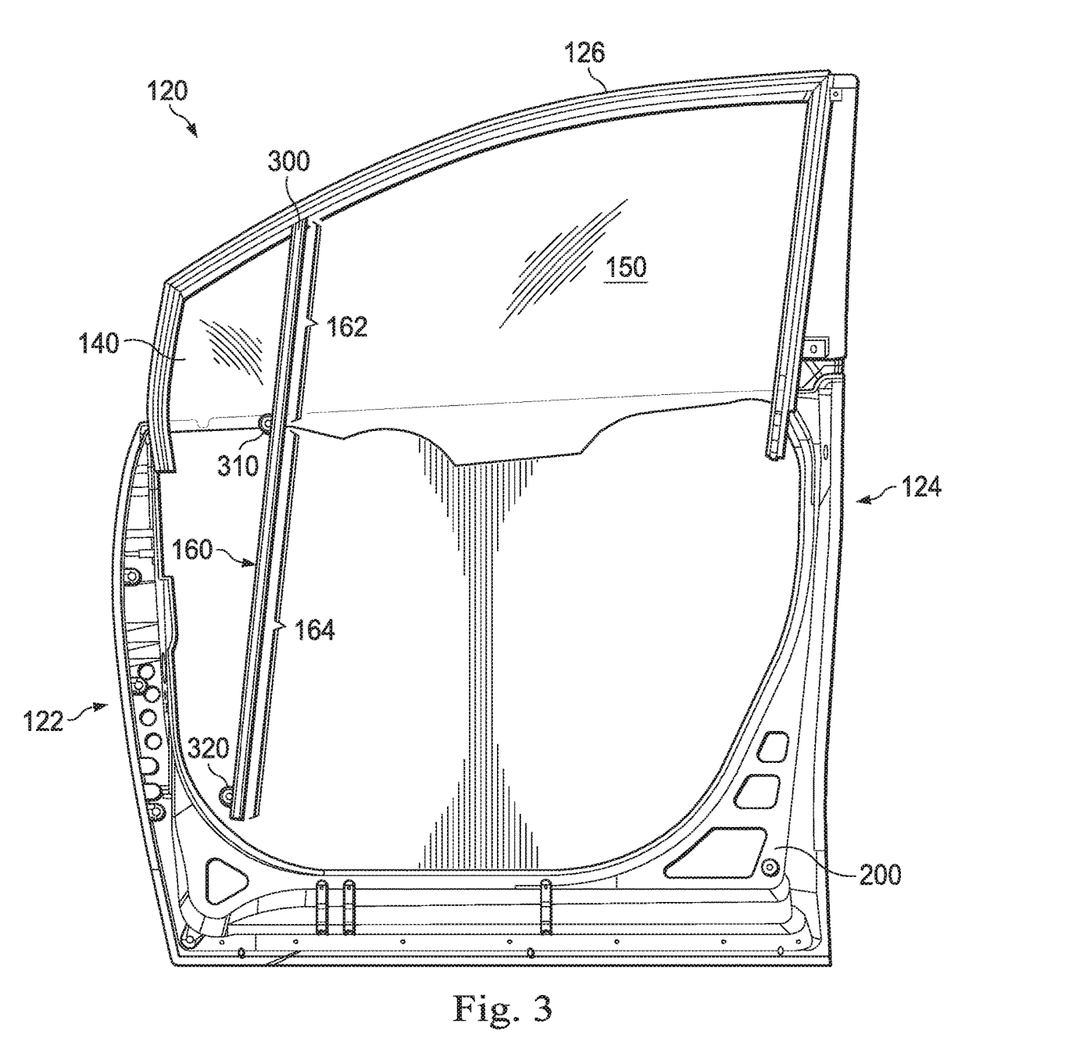
FIG. 3 is a diagrammatic illustration of a vehicle door according to one or more embodiments of the present disclosure.

FIG. 3 is a diagrammatic illustration of the vehicle door 120 according to one or more embodiments of the present disclosure. As shown in the embodiment in FIG. 3, the division bar 160 includes an upper portion 162 (which may also be referred to as a first portion) and a lower portion 164 (which may also be referred to as a second portion). In several examples, the upper portion 162 is located outside of the recess between the outer and inner panels 130, 200, and the lower portion 164 is located within the recess. As shown in the embodiment in FIG. 3, the division bar 160 is coupled to the door 120 at a top location, a middle location, and a bottom location.

In some embodiments, the division bar 160 is coupled to the door 120 at the top location by a top bracket 300 (which may also be referred to as an upper bracket). In such embodiments, a first portion of the top bracket 300 is coupled to the door frame 126, and a second portion of the top bracket 300 is coupled to the division bar 160. In several examples, the second portion of the top bracket 300 is coupled to the upper portion 162 of the division bar 160. In some embodiments, the division bar 160 is coupled to the inner panel 200 of the door 120 at the bottom location by a bottom bracket 320 (which may also be referred to as a lower bracket). In such embodiments, a first portion of the bottom bracket 320 is coupled to the inner panel 200 of the door 120, and a second portion of the bottom bracket 320 is coupled to the division bar 160. In several examples, the second portion of the bottom bracket 320 is coupled to the lower portion 164 of the division bar 160.

In some embodiments, the division bar 160 is coupled to the inner panel 200 of the door 120 at the middle location by a relief bracket 310. In such embodiments, a first portion of the relief bracket 310 is coupled to the division bar 160, and a second portion of the relief bracket 310 is coupled to the inner panel 200 of the door 120. In several examples, the first portion of the relief bracket 310 is coupled to the lower portion 164 of the division bar 160. In other examples, the first portion of the relief bracket is coupled to the division bar 160 at a location where the division bar 160 transitions from the upper portion 162 to the lower portion 164.

The connection between any of the brackets 300, 310, 320 and the division bar 160 may be any suitable type of mechanical connection (e.g., a welded connection, a bolted connection, etc.). Similarly, the connection between any of the brackets 300, 310, 320 and the inner panel 200 may be any suitable type of mechanical connection (e.g., a welded connection, a bolted connection, etc.). Also, in embodiments where the top bracket 300 is coupled to the door frame 126, the top bracket 300 may be coupled to the door frame 126 by any suitable type of mechanical connection (e.g., a welded connection, a bolted connection, etc.).

In several examples, when the door 120 is closed, the top bracket 300, the relief bracket 310, and the bottom bracket 320 each experience a strain. In some cases, the amount of strain experienced by the brackets 300, 310, 320 is substantially the same. In other cases, each of the brackets 300, 310, 320 experiences a different amount of strain. In still other cases, one or more of the strains experienced by the brackets 300, 310, 320 is substantially the same. For example, the top bracket 300 may experience a first strain, the relief bracket 310 may experience a second strain, and the bottom bracket 320 may experience a third strain. In some embodiments, the first and third strains are less than the second strain. Thus, in some embodiments, the relief bracket 310 experiences a larger strain than each of the top bracket 300 and the bottom bracket 320. Accordingly, in several examples, the relief bracket 310 may include a relief portion 316 (FIGS. 4A) to reduce the strain experienced by the relief bracket 310 and, therefore, the strain experienced by the inner panel 200 of the door 120. In some embodiments, one or both of the top bracket 300 and the bottom bracket 320 may also include a relief portion to reduce the strain experienced by the door frame 126 and the inner panel 200, respectively.

Figure 4A:
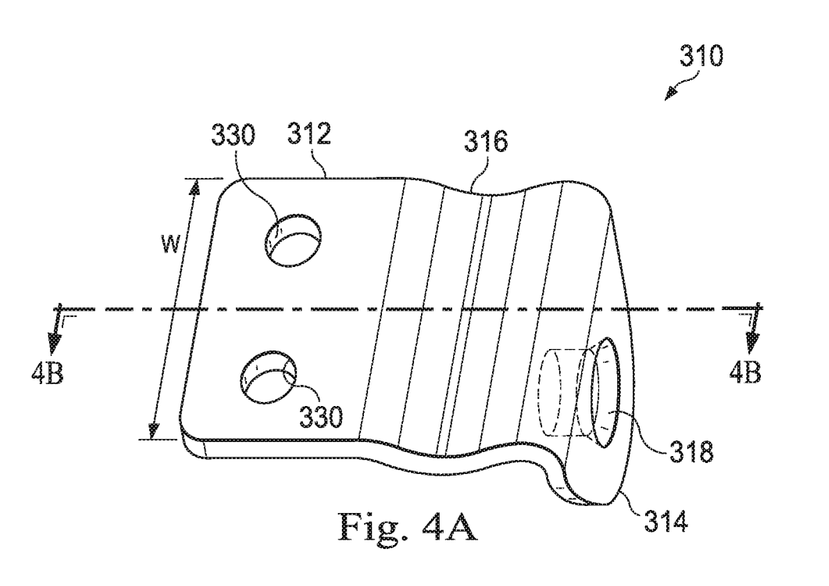
FIG. 4A is a global perspective view of a relief bracket according to one or more embodiments of the present disclosure.
Figure 4B:
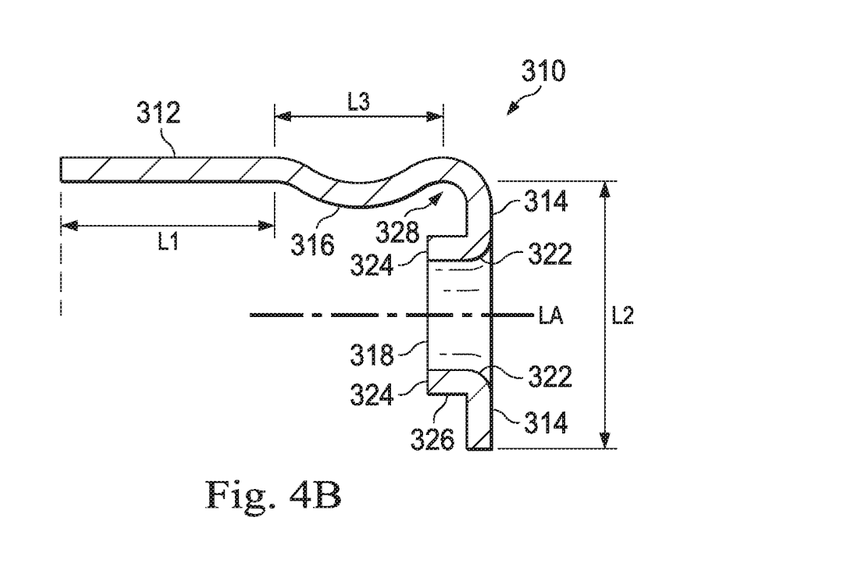
FIG. 4B is a section view of the relief bracket of FIG. 4A in a non-compressed state according to one or more embodiments of the present disclosure.

FIG. 4A is a global perspective view of the relief bracket 310 according to one or more embodiments of the present disclosure. FIG. 4B is a section view of the relief bracket 310 in a non-compressed state along section line 4B-4B of FIG. 4A according to one or more embodiments of the present disclosure. As shown in the embodiment in FIG. 4A, the relief bracket 310 includes a first portion 312, a second portion 314, and a relief portion 316. In several embodiments, the relief portion 316 may extend between the first portion 312 and the second portion 314. In some cases, the first portion 312 is longer than the second portion 314. In other cases, the second portion 314 is longer than the first portion 312. In some examples, a length L1 of the first portion 312 may range from half an inch to two inches. In some cases, a length L2 of the second portion 314 may range from half an inch to one and a half inches. In some embodiments, a length L3 of the relief portion 316 may range from half an inch to one inch. The L3 may define the length of the relief portion 316 when the relief portion 316 is not compressed. The lengths provided herein with respect to the first portion 312, the second portion 314, and the relief portion 316 are for example only, and other embodiments may include shorter lengths or longer lengths.

As further shown in the embodiment of FIG. 4A, the first portion 312 of the relief bracket 310 includes a width W. In some examples, the width W may range from one inch to three inches. Thus, in some embodiments, the width W of the first portion 312 may be longer than the length L1 of the first portion 312. The widths provided herein are for example only, and other embodiments may include shorter widths or longer widths. In some embodiments, a width of the relief portion 316 may be the same as the width W of the first portion 312. In other embodiments, the width of the relief portion 316 may be shorter or longer than the width W of the first portion 312. In several examples, a width of the second portion 314 may be the same as the width W of the first portion 312. In other embodiments, the width of the second portion 314 may be shorter or longer than the width W of the first portion 312.

As discussed above, in several embodiments, the first portion 312 is coupled to the division bar 160. In such embodiments, the second portion 314 is coupled to the inner panel 200 of the door 120. In the embodiment shown in FIG. 4A, the second portion 314 of the relief bracket 310 includes a hole 318 through which a bolt 510 (FIG. 5) may be received. The bolt 510 may secure the second portion 314 of the relief bracket 310 to the inner panel 200, which will be discussed in further detail below.

As shown in the embodiment of FIG. 4B, the hole 318 includes a longitudinal axis LA. The hole 318 further includes a trailing edge 322 and a leading edge 324. In some examples, the hole 318 is punched through the second portion 314 of the relief bracket 310. In such examples when the hole 318 is punched through the second portion 314, the trailing edge 322 is rounded. Additionally, in examples when the hole 318 is punched through the second portion 314, the leading edge 324 is substantially flat. In several embodiments, the hole 318 includes a lip 326, which may be formed as a result of the hole 318 being punched through the second portion 314. The lip 326 may extend in a direction substantially parallel to the first portion 312 of the relief bracket 310. In alternative embodiments, the hole 318 may be drilled, pierced, torched, or formed in any other suitable manner.

In several embodiments, the first portion 312 may be substantially parallel to the longitudinal axis LA of the hole 318. Thus, in some embodiments, the first portion 312 may be generally perpendicular to the second portion 314. In several examples, an angle 328 formed between the relief portion 316 and the second portion 314 may be within a range that is greater than or equal to 90° and less than or equal to 180°. As an example, the angle 328 may be 110°. As another example, the angle 328 may be 100°.

As shown in the embodiment of FIG. 4A, the first portion 312 includes two dimples 330. In other embodiments, the first portion 312 may include one dimple, three dimples, or any other suitable number of dimples. In some examples, the dimples 330 are used to assist with connecting (e.g., by a welded connection) the first portion 312 of the relief bracket 310 to the second portion 164 of the division bar 160. In some embodiments, a diameter of each of the dimples 330 may be smaller than a diameter of the dimple 318. In other embodiments, the diameter of each of the dimples 330 may be equal to or greater than the diameter of the dimple 318. In some embodiments, a diameter of each of the dimples 330 may range from one eighth of an inch to half an inch. The diameters provided herein are for example only, and other embodiments may include smaller diameters or larger diameters. In some alternative embodiments, the dimples 330 may be holes that extend through the first portion 312.

The relief portion 316 is used to reduce the strain experienced by the inner panel 200 of the door 120 when, for example, the door 120 is being closed. In several embodiments, the relief portion 316 is a curved portion. In some examples, the relief portion 316 may be hemispherical, symmetrically curved, asymmetrically curved, or any other suitable non-linear shape. In some embodiments, the relief portion 316 deflects when the relief bracket 310 experiences a strain. For example, the relief portion 316 may compress such that the first portion 312 moves toward the second portion 314 in a direction generally parallel to the longitudinal axis LA. Similarly, the relief portion 316 may expand/stretch such that the first portion 312 moves away from the second portion 314 in a direction generally parallel to the longitudinal axis LA. The compression and/or expansion of the relief portion 316 dampens the strain experienced by the inner panel 200 of the door 120 by absorbing some or all of the strain imparted by the sliding window 150, for example. Therefore, the inner panel 200 may have increased durability and a longer lifespan, which can lead to lower maintenance costs for the vehicle 110.

Figure 4C:
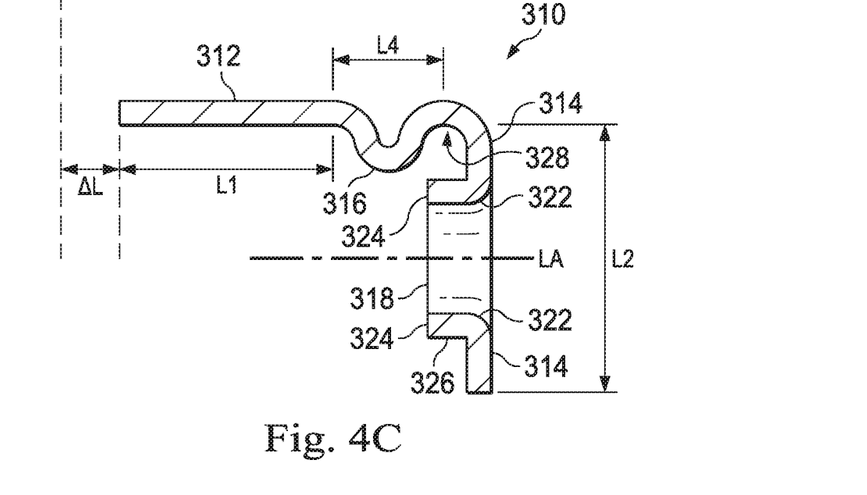
FIG. 4C is a section view of the relief bracket of FIG. 4A in a compressed state according to one or more embodiments of the present disclosure.

FIG. 4C is a section view of the relief bracket 310 in a compressed state along section line 4B-4B of FIG. 4A according to one or more embodiments of the present disclosure. As discussed above, the relief portion 316 may compress such that the first portion 312 moves toward the second portion 314 in a direction generally parallel to the longitudinal axis LA. In some embodiments, when the relief portion 316 compresses, the length of the relief portion 316 may change from the length L3 in the non-compressed state (FIG. 4B) to a length L4 in the compressed state (FIG. 4C). A difference ΔL between the lengths L3 and L4 may range from 0.5 millimeters to 1.5 millimeters. The difference in length provided herein is for example only, and other embodiments may include larger or smaller differences in length. In several examples, when the relief portion 316 compresses, the length L1 of the first portion 312 remains the same length when the relief bracket 310 is in the non-compressed state and the compressed state. In other examples, the length L1 of the first portion 312 may decrease when the relief bracket 310 is in the compressed state. In such examples, the change in length of the length L1 may be less than the difference ΔL between the lengths L3 and L4 of the relief portion 316.

While three brackets have been discussed above, it is to be understood that the door 120 may include any number of brackets necessary to couple components to the door 120. For example, the division bar 160 may be coupled to the inner panel 200 of the door 120 with one bracket, two brackets, three brackets, four brackets, five brackets, or any other number of brackets. Any one or more of these brackets may include a relief portion 316 to reduce the strain put on the inner panel 200 of the door 120 when the door 120 is being closed, for example.

Figure 5:
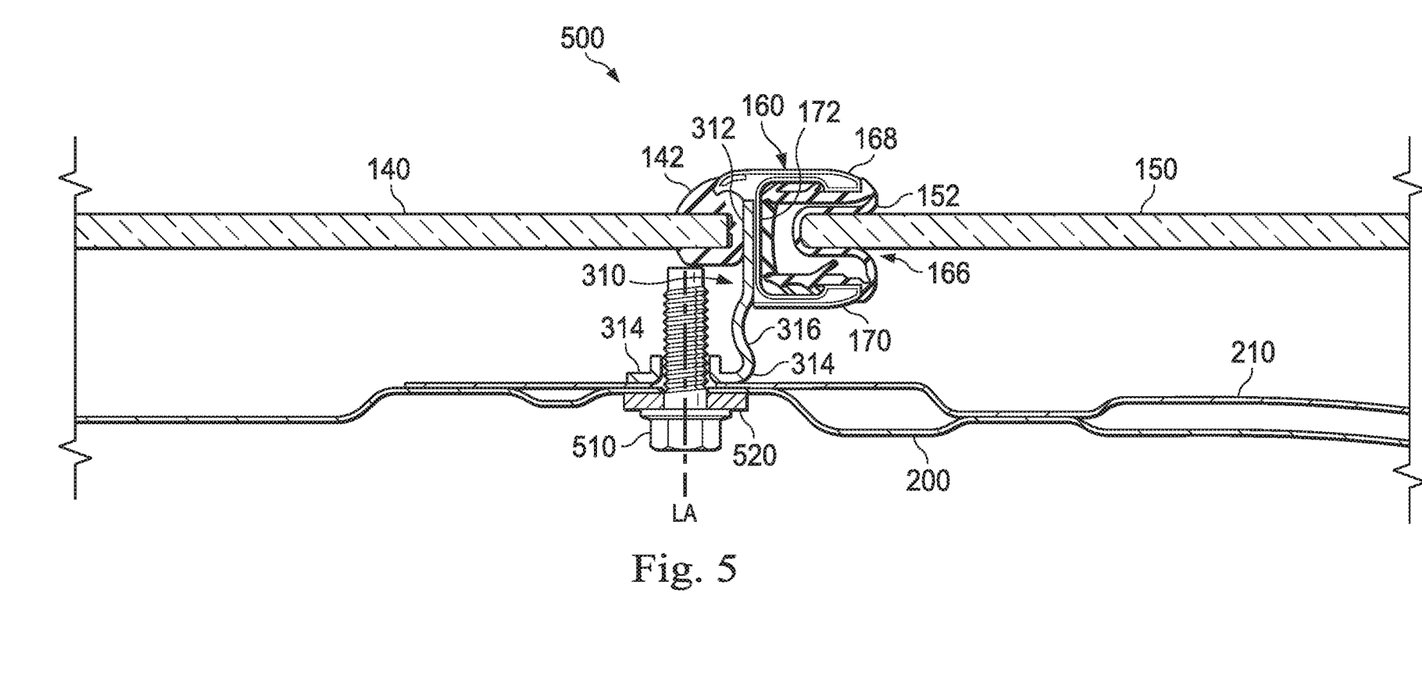
FIG. 5 is a section view of the vehicle door of FIG. 2 and the relief bracket of FIGS. 4A-4C according to one or more embodiments of the present disclosure.

FIG. 5 is a section view of the vehicle door 120 and the relief bracket 310 according to one or more embodiments of the present disclosure. In the embodiment shown in FIG. 5, a system 500 includes the fixed window 140, a fixed window seal 142, the sliding window 150, a sliding window seal 152, the division bar 160, the inner panel 200 of the door 120, an inner panel reinforcement member 210, the bolt 510, and a washer 520. As discussed above with respect to FIG. 2, the division bar 160 guides the sliding window 150 as the sliding window 150 moves between a rolled up position (which may also be referred to as a first position) and a rolled down position (which may also be referred to as a second position). In several embodiments, the division bar 160 includes a channel 166. The channel 166 receives the sliding window 150. The channel 166 may extend from the upper portion 162 of the division bar 160 to the lower portion 164 of the division bar 160. As further shown in FIG. 5, the sliding window seal 152 may be received by the channel 166. In some embodiments, the sliding window 150 is received by the channel 166 of the division bar 160 without the sliding window seal 152.

In several embodiments, the channel 166 of the division bar 160 is defined by an outer wall 168 of the division bar 160, an inner wall 170 of the division bar 160, and a back wall 172 of the division bar 160. In the embodiment shown in FIG. 5, the outer wall 168, the inner wall 170, and the back wall 172 form a generally c-shaped division bar 160.

As discussed above with respect to FIG. 4A, the first portion 312 of the relief bracket 310 may be coupled to the division bar 160. As shown in FIG. 5, the first portion 312 of the relief bracket 310 may be coupled to the back wall 172 of the division bar 160. In other embodiments, the relief bracket 310 may be coupled to any other portion of the division bar 160, depending on the arrangement of the components within the door 120. As further shown in the embodiment in FIG. 5, the first portion 312 of the relief bracket 310 extends in a direction substantially perpendicular to the inner panel 200 of the door 120. In some examples, the first portion 312 of the relief bracket 310 is coupled to the fixed window seal 142 as well. In such examples, the first portion 312 is located between the fixed window seal 142 and the back wall 172 of the division bar 160, as shown in FIG. 5.

In several embodiments, the bolt 510 is used to couple the second portion 314 of the relief bracket 310 to the inner panel 200 of the door 120. As shown in the embodiment in FIG. 5, a washer 520 is placed between the bolt 510 and the inner panel 200. This may help preserve the life of the inner panel 200 and prevent damage to the inner panel 200 that may otherwise be caused by the bolt 510. In some examples, the bolt 510 extends through the hole 318 of the relief bracket 310. In such examples, the longitudinal axis LA of the hole 318 may be coaxial with a longitudinal axis of the bolt 510. In other embodiments, as discussed above, the second portion 314 of the relief bracket 310 may be coupled to the inner panel 200 in any other suitable manner. In some examples, the inner panel reinforcement member 210 provides support for the inner panel 200, which may increase the durability of the inner panel 200.

Figure 6:
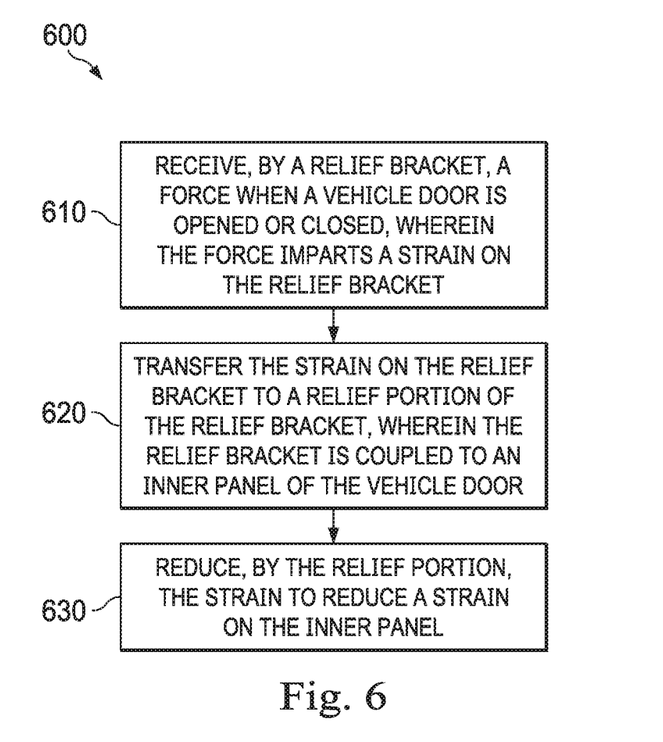
FIG. 6 is a flow chart illustration of a method of operating the system of FIGS. 1-3, 4A-4C, and 5 according to one or more embodiments of the present disclosure.

FIG. 6 is a flow chart illustration of a method of operating the system of FIGS. 1-3 and 4A-B according to one or more embodiments of the present disclosure. In several embodiments, as discussed above, when the door 120 is opened or closed, the windows of the vehicle 110 impart a force on a relief bracket coupled to an inner panel of the vehicle door 120. The force imparts a strain on the relief bracket. The strain is then transferred to a relief portion of the relief bracket. The relief portion of the relief bracket reduces the strain on the inner panel by absorbing and dampening some or all of the strain before the strain is received by the inner panel of the door 120.

In one such embodiment, as illustrated in FIG. 6, the method is generally referred to by the reference numeral 600 and includes at a step 610 receiving, by a relief bracket, a force when a vehicle door is opened or closed, wherein the force imparts a strain on the relief bracket. In some embodiments, when the door 120 is opened or closed, the fixed window 140 and/or the sliding window 150 imparts the force on the relief bracket 310.

At a step 620, during or after receiving the strain when the vehicle door is opened or closed, the strain on the relief bracket is transferred to a relief portion of the relief bracket. In some examples, as discussed above, the relief bracket 310 is coupled to the inner panel 200 of the door 120. In several embodiments, the relief portion 316 absorbs and dampens the strain imparted on the relief bracket 310. In some examples, the relief portion 316 is a non-linear portion that compresses when the door 120 is being closed, for example.

At a step 630, during or after transferring the strain to the relief portion, the relief portion reduces the strain to reduce a strain on the inner panel. As discussed above, the relief portion 316 of the relief bracket 310 compresses when the door 120 is being closed. In some embodiments, the relief portion 316 compresses in a direction substantially perpendicular to the inner panel 200 of the door 120. This compression reduces the strain experienced by the inner panel 200 when the door 120 is being closed, for example.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems. In several embodiments, hardware may include any physical device that is capable of storing machine-readable instructions, such as memory or other data storage devices. In several embodiments, software encompasses any set of instructions capable of being executed on a node such as, for example, on a client machine or server. In several embodiments, combinations of software and hardware could also be used for providing enhanced functionality and performance for certain embodiments of the present disclosure. For example, software and/or hardware may be used to open and/or close the sliding window 150 electronically.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes, and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the borrower not to invoke 35 U.S.C. § 112, paragraph 6 for any limitations of any of the claims herein, except for those in which the claim expressly uses the word "means" together with an associated function.

What is claimed is:

1. A system for reducing strain on a vehicle door, the system comprising:
   the vehicle door comprising:
     an inner panel; and
     a division bar comprising a first portion and a second portion; and
   a relief bracket configured to reduce strain on the inner panel when the vehicle door is closed, wherein the relief bracket comprises:
     a first portion coupled to the second portion of the division bar;
     a second portion coupled to the inner panel; and
     a relief portion extending between the first portion and the second portion, wherein a direction of compression of the relief portion is generally parallel to the first portion.

2. The system of claim 1, wherein the first portion of the relief bracket extends in a direction generally perpendicular to the inner panel of the vehicle door, and wherein the relief portion of the relief bracket comprises a non-linear portion.

3. The system of claim 2, wherein when the strain is imparted on the inner panel of the vehicle door, the relief portion of the relief bracket is configured to compress in the direction generally perpendicular to the inner panel.

4. The system of claim 2, wherein the relief portion comprises a hemispherical shape.

5. The system of claim 1, wherein the first portion of the relief bracket extends in a direction generally perpendicular to the second portion of the relief bracket.

6. The system of claim 1, wherein:
   the vehicle door further comprises:
     an outer panel;
     a recess between the outer panel and the inner panel;
     a first window configured to remain in a fixed position; and
     a second window configured to move between a first position and a second position, wherein the first position is outside of the recess, and the second position is within the recess; and
   the division bar further comprises a channel extending through the first and second portions, the channel configured to receive the second window to guide the second window as the second window moves between the first and second positions.

7. The system of claim 1, wherein the system further comprises an upper bracket and a lower bracket, and wherein the vehicle door further comprises a frame.

8. The system of claim 7, wherein:
   a first portion of the upper bracket is coupled to the frame, and a second portion of the upper bracket is coupled to the first portion of the division bar;
   a first portion of the lower bracket is coupled to the inner panel of the vehicle door, and a second portion of the lower bracket is coupled to the second portion of the division bar; and the first portion of the relief bracket is coupled to the inner panel of the vehicle door at a location between the upper and lower brackets.

9. The system of claim 8, wherein when the vehicle door is closed, a first strain is received by the upper bracket, a second strain is received by the relief bracket, and a third strain is received by the lower bracket.

10. The system of claim 9, wherein the first and third strains are each less than the second strain.

11. A system for reducing strain on a vehicle door, the system comprising:
the vehicle door comprising:
an inner panel; and
a division bar comprising a first portion and a second portion; and
a relief bracket configured to reduce strain on the inner panel when the vehicle door is closed, wherein the relief bracket comprises:
a first portion coupled to the second portion of the division bar;
a second portion coupled to the inner panel; and
a relief portion extending between the first portion and the second portion,
wherein when the strain is imparted on the inner panel of the vehicle door, the relief portion of the relief bracket is configured to compress in a direction generally perpendicular to the inner panel.

12. The system of claim 11, wherein:
the first portion of the relief bracket extends in the direction generally perpendicular to the inner panel of the vehicle door; and
the relief portion of the relief bracket comprises a non-linear portion.

13. The system of claim 11, wherein:
the vehicle door further comprises:
an outer panel;
a recess between the outer panel and the inner panel;
a first window configured to remain in a fixed position; and
a second window configured to move between a first position and a second position, wherein the first position is outside of the recess, and the second position is within the recess; and
the division bar further comprises a channel extending through the first and second portions, wherein the channel is configured to receive the second window to guide the second window as the second window moves between the first and second positions.

14. The system of claim 11, wherein the system further comprises an upper bracket and a lower bracket, and wherein:
a first portion of the upper bracket is coupled to a frame of the vehicle door, and a second portion of the upper bracket is coupled to the first portion of the division bar;
a first portion of the lower bracket is coupled to the inner panel of the vehicle door, and a second portion of the lower bracket is coupled to the second portion of the division bar; and
the first portion of the relief bracket is coupled to the inner panel of the vehicle door at a location between the upper and lower brackets.

15. The system of claim 14, wherein when the vehicle door is opened or closed, a first strain is received by the upper bracket, a second strain is received by the relief bracket, and a third strain is received by the lower bracket.

16. The system of claim 15, wherein the first and third strains are each less than the second strain.

17. A method for reducing strain on a vehicle door, the method comprising:
receiving, by a relief bracket, a force when the vehicle door is opened or closed, wherein the force imparts the strain on the relief bracket;
transferring the strain on the relief bracket to a relief portion of the relief bracket, wherein the relief bracket is coupled to an inner panel of the vehicle door; and
reducing, by the relief portion, the strain to reduce a strain on the inner panel, wherein a first portion of the relief bracket is coupled to a division bar, a second portion of the relief bracket is coupled to the inner panel, and the relief portion of the relief bracket extends between the first and second portions of the relief bracket, and wherein a direction of compression of the relief portion is generally parallel to the first portion.

18. The method of claim 17, wherein receiving the force when the vehicle door is opened or closed comprises receiving the force from a window of the vehicle door.

19. The method of claim 17, wherein reducing the strain comprises compressing, as a result of the strain on the relief bracket, the relief portion of the relief bracket in a direction generally perpendicular to the inner panel of the vehicle door.

20. The method of claim 17, wherein the first portion of the relief bracket extends in a direction generally perpendicular to the second portion of the relief bracket.

* * * * *